US 6,616,197 B2
Sep. 9, 2003

(54) RESILIENT RETENTION METHOD

(75) Inventor: Richard K. Sampson, Fort Colins, CO (US)

(73) Assignee: Kent Systems, LLC, Fort Collins, CO (US)

(*) Notice: Subject to any disclaimer, the term of this patent is extended or adjusted under 35 U.S.C. 154(b) by 0 days.

(21) Appl. No.: 10/000,576

(22) Filed: Oct. 23, 2001

(65) Prior Publication Data

US 2002/0089181 A1 Jul. 11, 2002

Related U.S. Application Data

(62) Division of application No. 09/305,229, filed on May 4, 1999, now Pat. No. 6,305,724, which is a division of application No. 08/806,391, filed on Feb. 26, 1997, now Pat. No. 5,937,885, which is a division of application No. 08/463,692, filed on Jun. 5, 1995, now Pat. No. 5,799,987.

(51) Int. Cl.[7] .............................................. F16L 21/02
(52) U.S. Cl. ....................... 285/376; 285/361; 285/317; 285/401
(58) Field of Search ...................... 29/890.14, 890.144; 285/81, 360, 361, 93, 376, 921, 423, 148.27, 401, 402, 33, 34, 35, 87, 305, 311, 312, 313–318; 137/614.03, 614.04, 614.02, 614, 798.1

(56) References Cited

U.S. PATENT DOCUMENTS

| | | |
|---|---|---|
| 1,029,819 A | 6/1912 | Nylander |
| 1,033,187 A | 7/1912 | Metzger |
| 1,117,762 A | 11/1914 | Barcus |
| 1,193,446 A | 8/1916 | Wells |
| 1,259,684 A | 3/1919 | Vinten |
| 1,679,825 A | 8/1928 | Holmgreen et al. |
| 1,800,998 A | 4/1931 | Hansen |
| 2,056,524 A | 10/1936 | Johnson ....................... 217/113 |
| 2,346,445 A | 4/1944 | Merker et al. ............... 217/107 |
| 2,353,252 A | 7/1944 | Leisure .......................... 85/32 |
| 2,470,800 A | 5/1949 | Ashton ......................... 285/25 |
| 2,577,009 A | 12/1951 | Frantz .......................... 291/11 |
| 2,930,131 A | 3/1953 | Snyder ........................ 137/588 |
| 2,661,018 A | 12/1953 | Snyder ........................ 137/588 |
| 2,790,571 A | 4/1957 | Flaith et al. .................. 217/99 |
| 2,931,668 A | 4/1960 | Baley ........................... 284/19 |
| 3,227,380 A | 1/1966 | Pinkston ..................... 239/427 |
| 3,276,799 A | 10/1966 | Moore et al. ................ 287/104 |
| 3,512,808 A | 5/1970 | Graham ....................... 285/189 |
| 3,523,701 A | 8/1970 | Graham ....................... 285/150 |
| 3,538,940 A | 10/1970 | Graham ...................... 137/271 |

(List continued on next page.)

OTHER PUBLICATIONS

ACE Quick Coupler Set, ACE product 72372.
Bowes Manufacturing, Inc. Product Data Sheet for Quick Connect/Disconnect Couplings, pp. 1,3, and 4, receiived Sep. 29, 1986.

(List continued on next page.)

*Primary Examiner*—Gregory Vidovich
*Assistant Examiner*—Eric Compton
(74) *Attorney, Agent, or Firm*—Santangelo Law Offices, P.C.; Luke Santangelo; Alfred K. Wiedmann Jr.

(57) ABSTRACT

A resilient retention method which retains two assemblies axially through the use of a flange and lip arrangement and simultaneously retains those assemblies rotationally through either a radial detent or a snap spring are shown in variations. The designs are especially configured for molding so that each might utilize the material properties available and yet be economically manufactured. Further, user features including both visual and potentially audible indications of full assembly are incorporated into the designs and automatically achieved. Shut-off valve designs are shown which are automatically delayed in opening until some axial retention occurs to minimize any blow-off or other undesirable operational events. Swivel features may be incorporated when the application requires.

7 Claims, 13 Drawing Sheets

U.S. PATENT DOCUMENTS

| | | | |
|---|---|---|---|
| 3,560,027 A | 2/1971 | Graham | 285/150 |
| 3,563,265 A | 2/1971 | Graham | 137/269 |
| 3,588,149 A | 6/1971 | Demler et al. | 285/110 |
| 3,712,583 A | 1/1973 | Martindale et al. | 251/149.4 |
| 3,750,238 A | 8/1973 | Tanner | 24/1.81 |
| 3,815,887 A | 6/1974 | Curtis et al. | 267/91 |
| 3,876,234 A | 4/1975 | Harms | 285/38 |
| 3,889,710 A | 6/1975 | Brost | 137/512.15 |
| 3,899,200 A | 8/1975 | Gamble | 285/93 |
| 3,990,674 A | 11/1976 | Schattenberg | 251/75 |
| 4,129,145 A | 12/1978 | Wynn | 137/541 |
| 4,142,546 A | 3/1979 | Sandau | 137/321 |
| 4,331,175 A | 5/1982 | Brake et al. | 137/322 |
| 4,340,200 A | 7/1982 | Stegmeier | 249/3 |
| 4,434,121 A | 2/1984 | Schaper | 264/174 |
| 4,436,124 A | 3/1984 | Borstelmann | 141/5 |
| 4,436,125 A | 3/1984 | Blenkush | 285/247 |
| 4,471,893 A | 9/1984 | Knickerbocker | 222/402.22 |
| 4,500,118 A | 2/1985 | Blenkush | 285/247 |
| 4,527,745 A | 7/1985 | Butterfield et al. | 239/600 |
| 4,541,457 A | 9/1985 | Blenkush | 285/247 |
| 327,509 A | 10/1985 | Aldridge | |
| 4,560,525 A | 12/1985 | Ryan | 264/136 |
| 4,613,112 A | 9/1986 | Phlipot et al. | 251/149.6 |
| 4,630,847 A | 12/1986 | Blenkush | 285/29 |
| 4,694,544 A | 9/1987 | Chapman | 24/625 |
| 2,429,782 A | 10/1987 | Versoy | 285/163 |
| 4,699,298 A | 10/1987 | Grant et al. | 222/400 |
| 4,703,957 A | 11/1987 | Blenkush | 285/239 |
| 4,738,401 A | 4/1988 | Filicicchia | 239/600 |
| 4,747,898 A | 5/1988 | Woltron | 156/153 |
| 4,903,995 A | 2/1990 | Blenkush et al. | 285/38 |
| 4,928,859 A | 5/1990 | Krahn et al. | 222/402.14 |
| 4,934,655 A | 6/1990 | Blenkush et al. | 251/149.1 |
| 4,946,200 A | 8/1990 | Blenkush et al. | 285/38 |
| 5,009,252 A | 4/1991 | Faughn | 137/614.04 |
| 5,033,777 A | 7/1991 | Blenkush | 285/317 |
| 5,052,725 A | 10/1991 | Meyer et al. | 285/308 |
| 5,087,086 A | 2/1992 | Snedeker | 285/361 |
| 5,104,158 A | 4/1992 | Meyer et al. | 285/308 |
| 5,178,303 A | 1/1993 | Blenkush et al. | 222/153 |
| 5,190,224 A | 3/1993 | Hamilton | 239/600 |
| 5,219,188 A * | 6/1993 | Abe et al. | |
| 5,316,041 A | 5/1994 | Ramacier, Jr. et al. | 137/614.04 |
| 5,341,812 A | 8/1994 | Allaire et al. | 128/696 |
| 5,353,836 A | 10/1994 | deCler et al. | 137/614.05 |
| 5,356,183 A | 10/1994 | Cole | 285/305 |
| D354,133 S | 1/1995 | Scavitto et al. | D24/129 |
| D357,307 S | 4/1995 | Ramacier, Jr. et al. | D23/262 |
| 5,494,074 A | 2/1996 | Ramacier, Jr. et al. | 737/614.04 |
| 5,545,152 A | 8/1996 | Funderburk et al. | 604/283 |
| 5,607,190 A * | 3/1997 | Exandier et al. | |
| 5,639,064 A | 6/1997 | deCler et al. | 251/149.5 |
| 5,727,739 A | 3/1998 | Hamilton | 239/600 |
| 5,799,987 A | 9/1998 | Sampson | 285/81 |
| 5,918,815 A | 7/1999 | Wu | 239/345 |
| 5,937,885 A | 8/1999 | Sampson | 137/1 |
| 6,199,913 B1 * | 3/2001 | Wang | |

OTHER PUBLICATIONS

Bowes Manufacturing, Inc. Product Disclosure for 1/4 turn push–to–connect air line couplings, IAN.

Colder Products Company,"A Simple Breakthrough in Quick Disconnect Couplings," Product Deisgn and Development, Jun. 1986, p. 4.

GRA–TEC, Inc., "Easy Does It Choose GRA–Tec Quick Disconnect Couplings," Product Design and Development, Jun. 1986, p. 4.

"The Keck Connection," p. 900, Cole Palmer Instrument Company.

"The Smart Solution," Smart Products, Inc., "Male Threaded Check Valves".

Product disclosure for Quickjet® spray nozzles, IEN p. 69, Jun. 1986.

Zip Tip® Molded Plastic Quick Disconnect Spray Nozzles, Industrial Product Bulletin, vol. 52, p. 7.

* cited by examiner

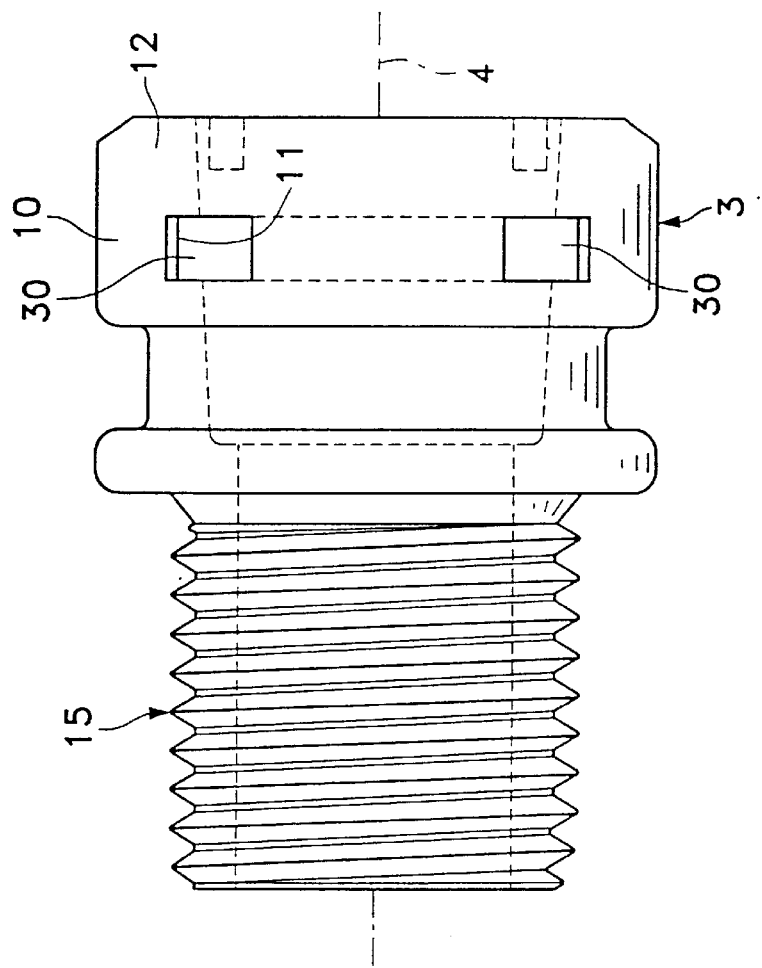
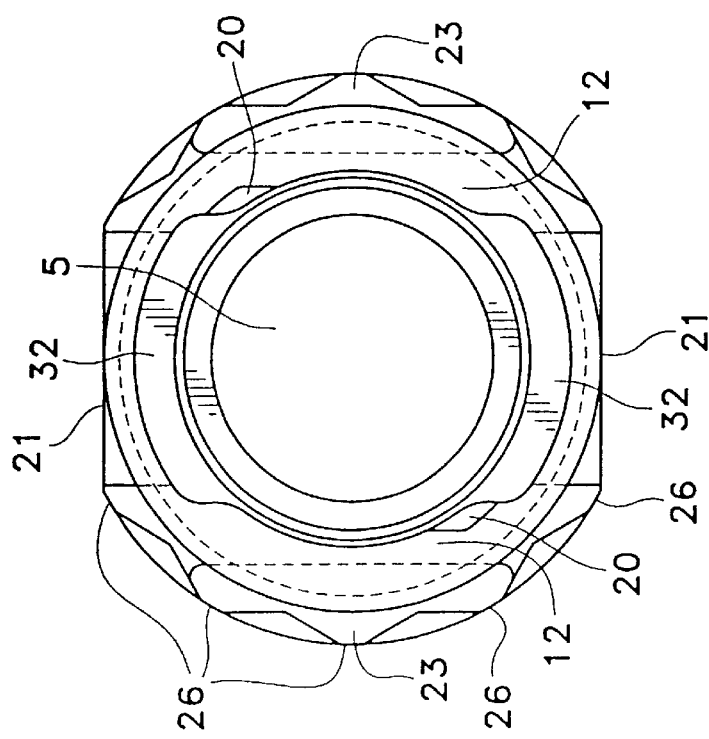
FIG. 3
FIG. 2

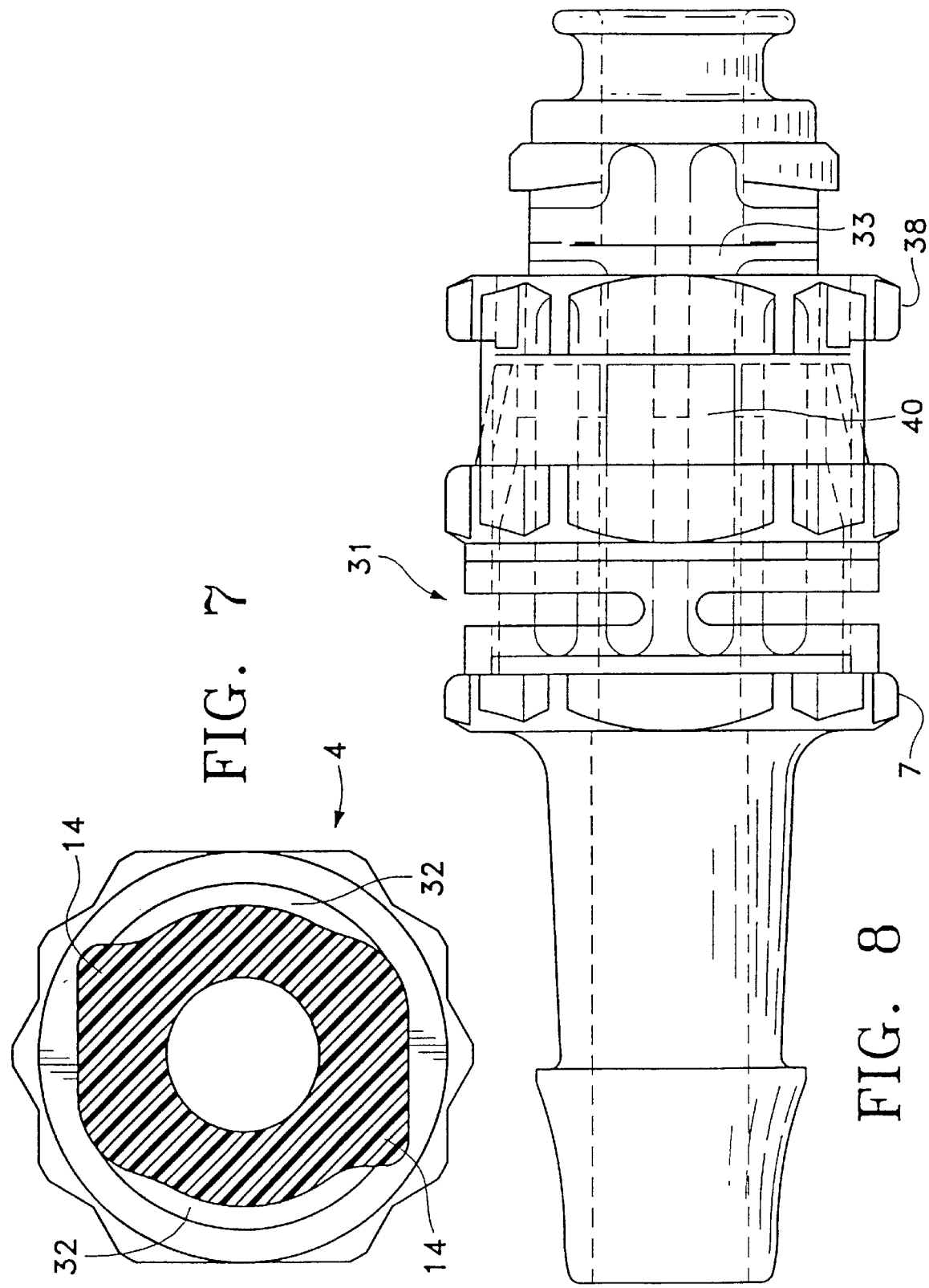

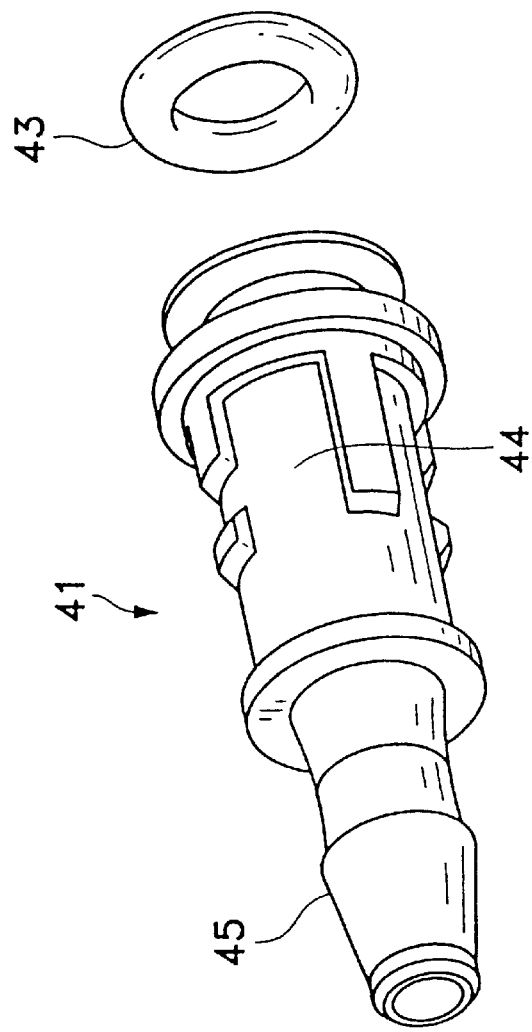
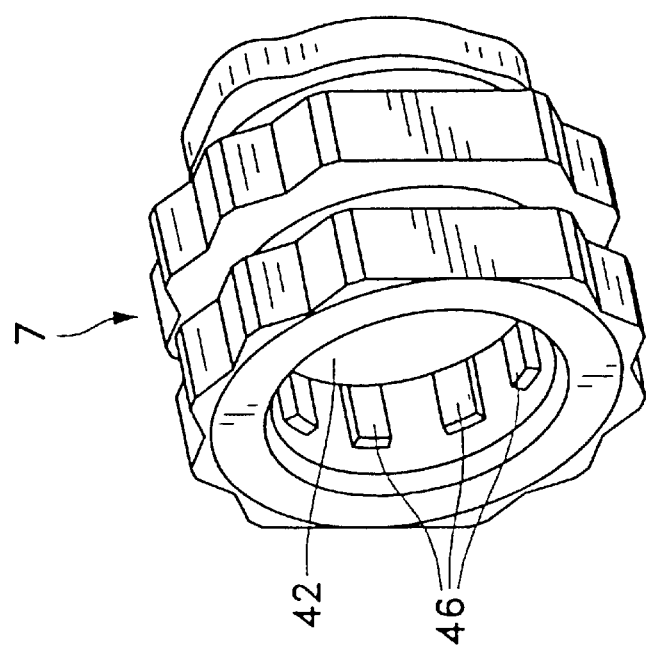
FIG. 10

RESILIENT RETENTION METHOD

This application is a divisional application of Ser. No. 09/305,229, filed May 4, 1999, now U.S. Pat. No. 6,305,724, which is a divisional application of application Ser. No. 08/806,391, filed Feb. 26, 1997, now issued as U.S. Pat. No. 5,937,885, which in turn is a divisional application of Ser. No. 08/463,692, filed Jun. 5, 1995, now issued as U.S. Pat. No. 5,799,987, each hereby incorporated by reference.

BACKGROUND OF THE INVENTION

This invention relates generally to fluid fittings. Specifically, it involves the field of molded coupling systems for quickly connecting and disconnecting fittings which handle fluids. The invention presents a number of compact designs which not only are economical to manufacture, but they also have a number of functional advantages. While especially adapted to accommodate the requirements of injection molded manufacture, the designs are suited to other types of manufacture as well.

The fluid fitting area is one which has existed for years. As more economic products have been sought the desire to adapt designs for injection molding has increased. In the majority of instances this adaptation has occurred by merely molding existing designs. In only limited instances have those designing products sought to create completely new designs which are especially adapted to a molding environment, that is, where a cavity shape is imparted to some type of material. One of the fields within this general area which has been particularly challenging to adapt for economical manufacture is that of fluid fitting quick disconnects. Often due to this field's sometimes unusual material requirements, it has been perceived as requiring a hybrid approach. Through this approach, while some components have been molded, others have been machined or the like. Thus, rather than being optimized for economical manufacture such as is available in the injection molding environment, designers often have accepted limitations in either operation or manufacture.

Naturally, the problems designers have faced are greatly varied based in part upon the application involved. In some applications, the physical size of the quick disconnect designs have been a challenge. In other applications, reliability and the actual operation of coupling the two assemblies together has been the challenge. Other problems have ranged from challenges in achieving adequate locking of the coupling to problems in creating shut-off valve subassemblies. Irrespective of the specific operational problems deemed paramount, it has been almost universally true that existing designs have not been able to be manufactured as economically as desired. In spite of a demand for high reliability and ease of use, consumers have been reluctant to incorporate components which cost many times the amount of a typical fitting. The present invention presents quick disconnect designs intended to satisfy most if not all these desires. Importantly, it does so through a design which was uniquely developed to utilize the strengths and minimize the weaknesses involved in a molding environment. Perhaps most importantly from a commercial perspective, the design is one which can be manufactured at fractions of the cost of many existing designs.

As is often true for fluid fittings in general, many aspects of the invention utilize elements which have long been available. In spite of this fact, and in spite of the fact that those skilled in the art of molded fluid fitting couplings had long desired such a design, the invention applies these elements in a fashion which achieves long felt needs very economically. Perhaps to some degree this may be due to the fact that prior to the teachings of this invention those skilled in this field may have been directed away from the utilization of a purely molded quick disconnect design. Instead, it appears that those involved in this field have tended to believe that it was necessary to pursue hybrid designs to achieve the desired results. The present invention shows that such assumptions were, in fact, not true. To some extent the embodiments disclosed might even be viewed as presenting unexpected results in that they show that a completely molded design can achieve most (if not all) of the previously existing design requirements.

SUMMARY OF THE INVENTION

The present invention provides a quick disconnect fluid fitting coupling system which can not only be completely molded but which also can consist of as little as two parts. In one embodiment, the design involves male and female assemblies which are held axially by a flange and which lock in place through a radially resilient detent at the flange's outer abutment. Another embodiment includes a molded annular spring which locks the two assemblies together. A number of other features such as swivels and shut-off valves are also disclosed. All of these may be utilized independently or in conjunction with each other to achieve a very universal system.

As mentioned, it is an object of the invention to achieve a practical design which properly balances the size, expense, and manufacturing needs of users desiring a fluid fitting coupling system. In keeping with this object, one of the goals is to provide a completely moldable design which not only is economical to assemble, but which is also easy to operate. It is also a goal to provide a sufficiently strong design without compromise due to molding. Further, a goal is to allow for a completely nonmetallic coupling system which can be used in those applications having such demands.

Yet another object of the invention is to allow for a system which satisfies operational needs. Thus goals include providing a system which is virtually foolproof in achieving a locked, coupled state, and which is very difficult for operators to misuse. These goals are achieved, in part, by providing for visual and possibly auditory indications of locking. They are also achieved by providing designs which can be configured for use in any direction and for use with a minimum of different directional operations when appropriate.

Another broad object of the invention is to present a system with many design variations available to system designers. In meeting the designer's needs, it is a goal to provide a system of parts and features which can be configured as appropriate to the specific application. For systems requiring a shut-off valve arrangement, the invention has as a goal, satisfying operator and safety needs by automatically achieving coupling retention prior to any opening of the shut-off valves within the assemblies.

Naturally, further objects of the invention are disclosed throughout other areas of the specification and claims.

BRIEF DESCRIPTION OF THE DRAWINGS

FIG. 2 is an end view of the female part shown in FIG. 1.

FIG. 3 is a side view of the female assembly shown in FIGS. 1 and 2.

FIG. 7 is an end cross sectional view of the assembled couplings as shown in FIG. 6.

FIG. 8 is a side view of a male part of another spring-locked embodiment.

FIG. 10 is an exploded perspective view of an embodiment with a swiveling male part.

DETAILED DESCRIPTION OF THE PREFERRED EMBODIMENT

Figure 1:
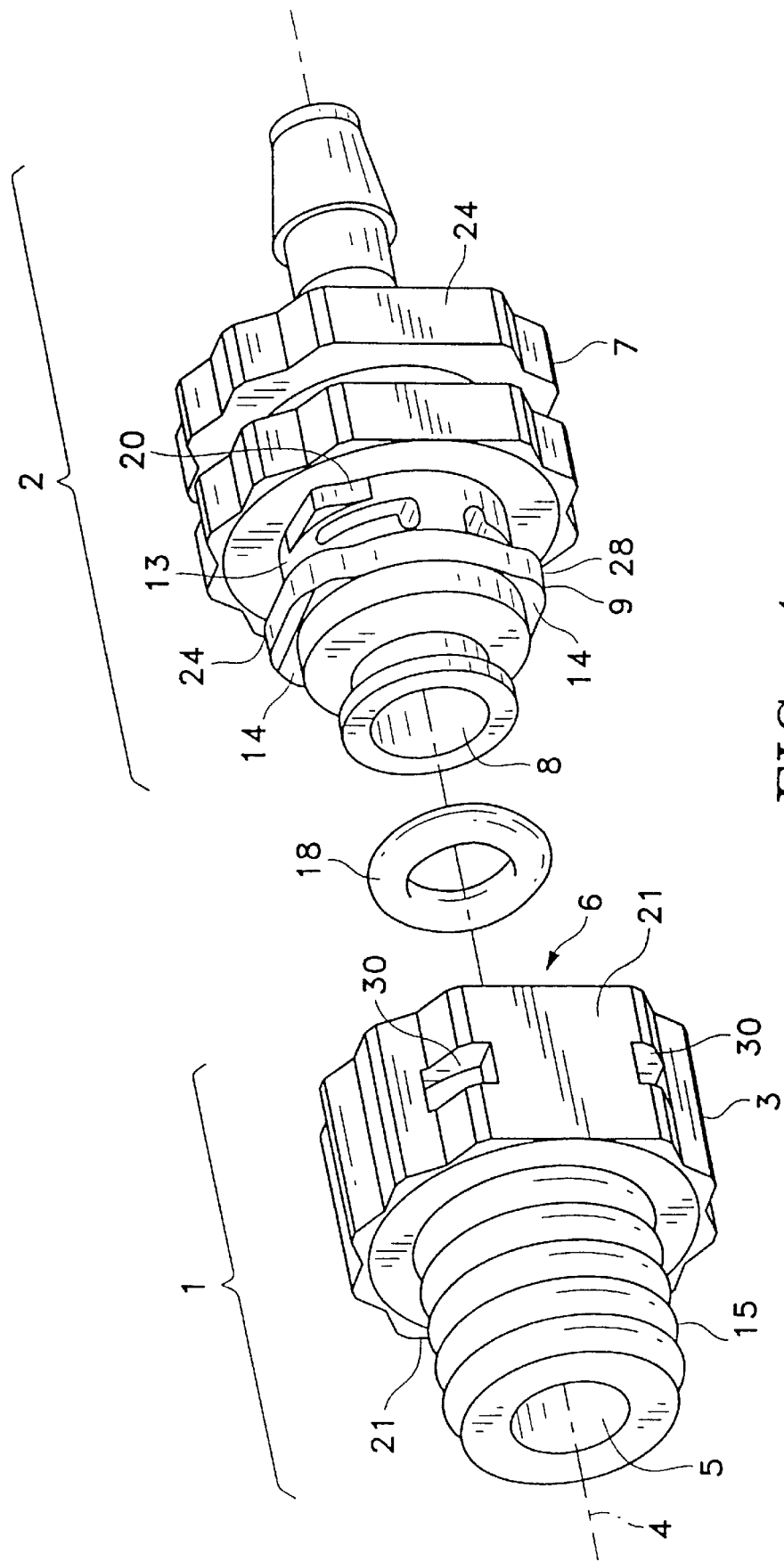
FIG. 1 is an exploded perspective view of one embodiment.

As can be seen from the drawings, the basic concepts of the present invention may be embodied in a number of different ways. FIG. 1 shows a basic coupling system according to the invention. In standard fashion, the system involves a first fluid fitting assembly (1) which is capable of being mated with and coupled to a second fluid fitting assembly (2).

As those involved in creating such coupling systems are well aware, it is generally desirable to have the maximum outer diameter of the system as small as possible while having the largest possible maximum inner diameter for the fluid to pass through. This is achieved to a significant degree in the design shown in FIG. 1. As shown, the first fluid fitting assembly (1) includes a first fluid fitting body (3) which is positioned about a central axis (4) within a first fluid passageway (5). In order to provide coupling, the first fluid fitting assembly (1) is responsive to a first axial retainer (6). As with almost all fluid fittings, first fluid fitting assembly (1) includes a fitting section (15) which may be a threaded portion as shown or some other type of fitting arrangement. The fitting section may be greatly varied, ranging from barb sections to luer arrangements and the like. Through such designs, the fitting coupling system is designed to be able to accommodate fluids, that is gasses (e.g., vacuum, pneumatics, etc.) or liquids (e.g., water, hydraulic fluid, etc.) which pass through or are maintained by the fluid passageways.

As is easily appreciated, in order to create a coupling, the second fluid fitting assembly (2) has a second fluid fitting body (7) within which there is a second fluid passageway (8). Importantly, the second fluid fitting body (7) is responsive to a second axial retainer (9) which is capable of engaging the first axial retainer (6). Once engaged, both the second fluid fitting assembly (2) and the first axial retainer (6) are then responsive to the second axial retainer (9). As may be understood from the arrangements shown, the term "responsive" encompasses a broad variety of interactions. In keeping with its broad meaning, the term includes a mere result orientation. It encompasses all situations where merely since one element is present, another element directly or indirectly is affected somehow. Naturally, it also includes narrower interpretations such as purely physical arrangements. Examples of these would include the two elements being attached to each other, the two elements touching, or even them being unitary sections of an integral component.

As shown in FIG. 1, both the first and second axial retainers involve a coordinated lip and flange design. For the first fluid fitting assembly (1) this is shown in FIG. 3 where it can be seen that the first fluid fitting body (3) has a lip support (10) to which is attached at least one retaining lip (12). As is discussed later with respect to rotationally retaining the coupled system, it should be understood that the lip support (10) has a lip support inner surface (11). Further, as shown it can be seen that the retaining lip (12) extends radially inward toward the central axis (4) from the lip support (10). As one enhancement, the first fluid fitting body (1) has structure in between the two lip supports (10). Unlike other designs by having this structure, the strength is enhanced and the entire area is surrounded and protected.

To mate with the first fluid fitting assembly (1), the second fluid fitting assembly (2) includes at least one flange (14) which is attached to a flange support (13) and which is capable of engaging the retaining lip (12). There may, of course, be two diametrically opposed flanges as shown. As those skilled in this field understand, with the balanced arrangement of two flanges as shown, the pressure capability is enhanced. Naturally, other balancing designs are possible; all that is necessary is that the flanges be equally spaced around the central axis (4). These types of designs not only afford better strength against failure, they also afford better sealing as there is less chance of a radial displacement of the seal. As those using an unbalanced arrangement have apparently not realized, through balancing the design, leakage is less likely. As shown, it also can be seen that the flanges (14) can extend radially outward beyond the flange supports (13) and can be axially fixed with respect to the second fluid fitting body (7). Further, the entire part may be designed for uniform molding thickness by including the relief areas shown.

To operate and couple this fluid fitting coupling system, it is only necessary to insert the first and second fluid fitting assemblies (1 and 2). This insertion may cause the coupling seal (18) to seal one assembly to the other. Next, the assemblies are axially engaged by rotating one (or a portion of one) with respect to the other (or a portion of the other) so that the flanges (14) slide under the retaining lips (12). This can be understood easier with reference to FIG. 2 where it can be understood that flanges (14) would initially fit within the flange recesses (32). Then, through at least some rotation of one fitting body with respect to the other fitting body, the flanges (14) would be rotated under the retaining lips (12) so that the first and second fluid assemblies (1 and 2) would be axially retained with respect to each other.

Figures 4, 5:
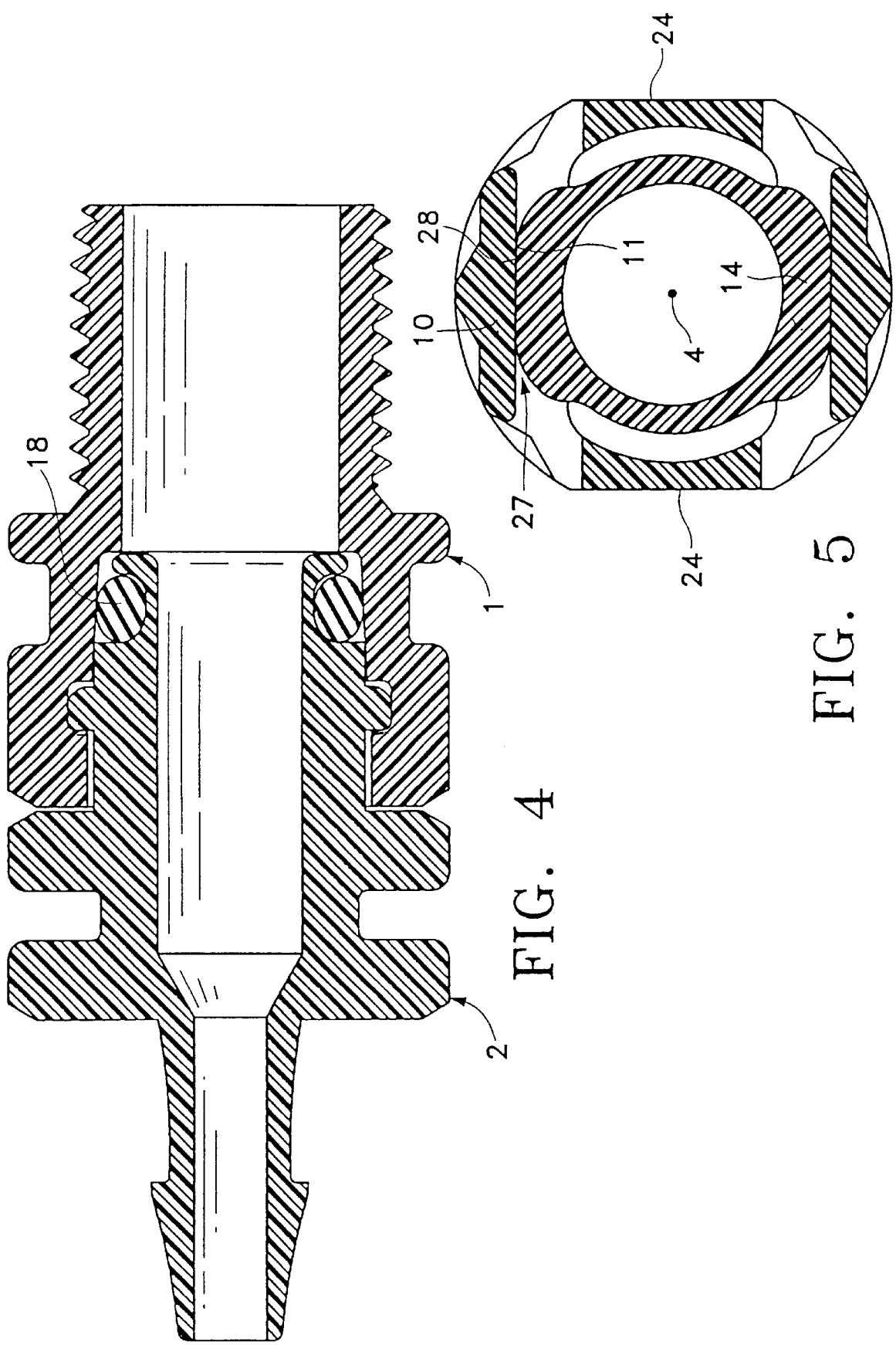
Figure 4 is a side cross sectional view of an assembled coupling as shown in FIG. 1.
FIG. 5 is an end cross sectional view of the assembled couplings as shown in FIG. 4.

As can be understood from FIG. 4, when assembled the coupling seal (18) is established between the first and second fluid fitting assemblies (1 and 2). This coupling seal (18)

may be simply an O-ring placed on second fluid fitting assembly (2). Additionally, it should be understood that a variety of other types of coupling seals are possible including, but not limited to, integral molded seals and the like. Further, coupling seal (18) may be entirely omitted. (It is expected, however, that in almost all fluid fitting applications it would be desirable to include some type of coupling seal (18) even if such were merely a close fit between the two assemblies. As may be appreciated, from FIG. 4, it can be seen that the type of coupling seal (18) shown is subjected only to one level of compression force during the assembly process. Unlike some other designs, the coupling seal (18) is never over-compressed and then relaxed when achieving the locking of the disconnect system.

Figure 6:
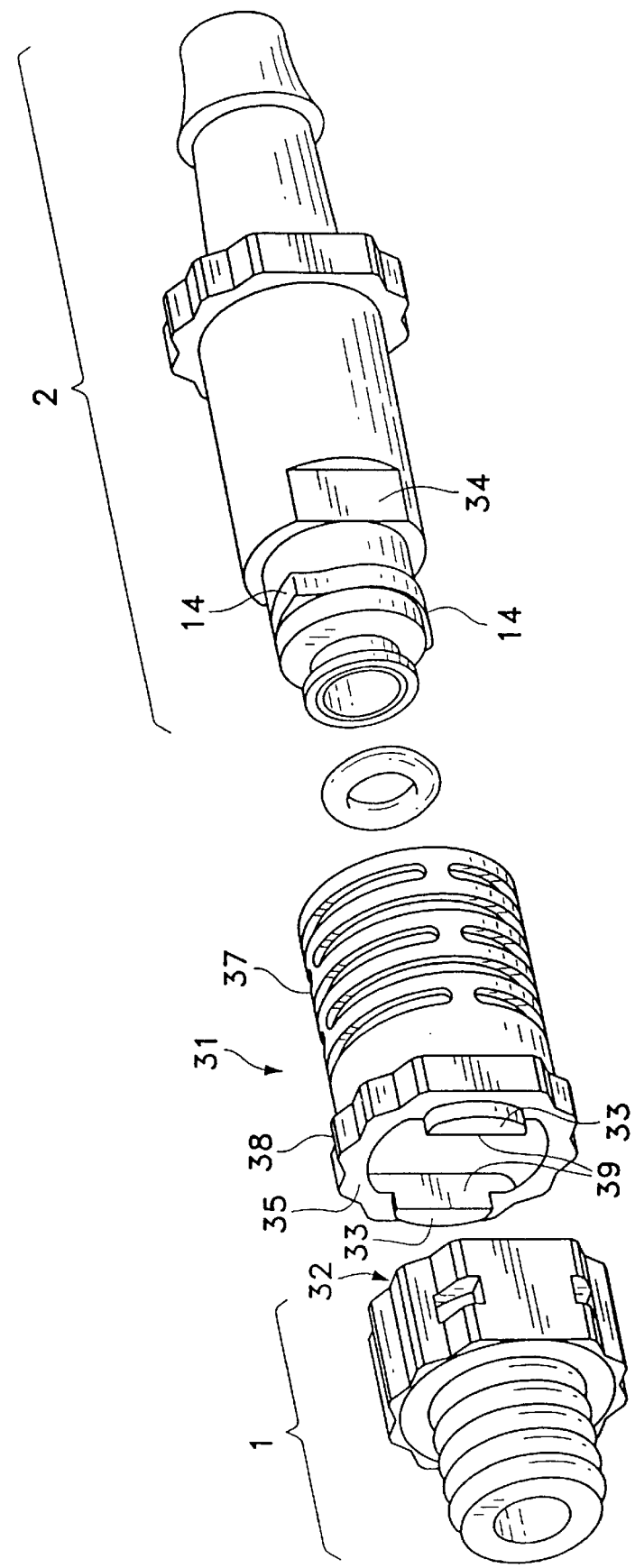
FIG. 6 is an exploded perspective view of a spring-locked embodiment.

In addition, it is possible to have the system incorporate some type of stops (20) which may limit the amount of rotation at a desired point. Naturally, such stops should be coordinated between the first and second assembly parts. There may be a great variety of different designs including tabs, recesses and even nonsymmetrical designs to achieve the desired end. A tab/recess arrangement is shown in FIGS. 1 and 2. For better strength, these are designed to have a more nearly radial mating occur at the point were it is desired to stop rotation. As is discussed later, a nonsymmetrical design is shown in FIGS. 6 and 7. Regardless of the design chosen, the stops may serve to limit rotation to the degree desired. Naturally, the stops may be entirely omitted. This may be desirable in instances where constant rotation (to engage and disengage) is desired.

Whether stops (20) are included or not, it can be important to include some type of rotational retainer. The rotational retainer would rotationally lock the first fluid fitting body (3) with respect to the second fluid fitting body (7) after they are fully engaged. It would limit the ability of the two fitting bodies to rotate with respect to each other. As perhaps best illustrated in FIG. 5, it can be understood that in the design shown, the rotational retainer may be achieved by properly designing the shape of the inner surface (11) of the lip support (10) and the outer surface (28) of the flange (14). As shown in FIG. 5, it may be understood that both the inner surface (11) of the lip support (10) and the outer surface (28) of the flange (14) may have planar portions which are designed to abut when the system is fully assembled. Regardless of the shape chosen, by purposefully avoiding a perfectly circular surface, the actual rotation of the two bodies with respect to each other can cause the surfaces to radially compress and then to relax as they lock in place. Further, since it is possible that the coupling system may be engaged for long periods of time, it may be desirable to have little or no axial compression when the parts are fully engaged. Thus, the radial resilience may not tend to decay with time in most applications.

As mentioned, the existence of compression creates the rotational locking. Since the compression would not be reduced until after the designs were fully assembled with respect to each other, it would serve as one indication of full assembly. No radial compression could occur (or be felt) unless the two assemblies were properly inserted. As shown, it should be understood that the radial compression would thus limit the rotation and would occur at the abutment (27) between the first and second fluid fitting assembly bodies (3 and 7).

Unlike other designs it can be understood that by using a radial resiliency to lock rotation, axial tension or forces play no part and are not necessary in order to accomplish retaining the two bodies rotationally. This enhances the coupling seal (18) by not requiring it to be overcompressed as mentioned later. Further, by using the abutment between the two pieces to achieve the lock, the design is somewhat foolproof in that no locking can be felt or achieved until the parts are correctly engaged. For reliability, simplicity of design, and manufacturing reasons, it is possible to use a design as shown where the abutment between the two pieces is not a separate flexing locking member. In keeping with the goal of providing easily varied configurations, this makes the system more universal. Such a design is also particularly well suited to a molded system because the materials used in molding can be somewhat resilient—and indeed may even be chosen for this characteristic. By having resilient material, the radial compression can form a radially resilient rotational lock at the abutment (27). Thus, the abutment (27) itself may create the radially resilient rotational lock.

As mentioned earlier, it is possible to have many different designs form the radially resilient rotational lock. By using planar surfaces, a relatively simple and moldable design is achieved. As can be seen, the planar portions are parallel to the central axis (4) and perpendicular from a line from the planar portion to the central axis. Other designs are possible ranging from separate elements to flexible arms to tab/recess arrangements. All that may be necessary is that the surfaces be noncircular and corresponding, that is, they coordinate with each other to achieve the desired effect. For the design shown it is also possible to have the abutment between the inner surface of the retaining lip (12) and the outer surface of the flange support (13) be appropriately shaped. While this is an equivalent design, it may not, however, be as optimum as the design shown since such an abutment would be closer to the central axis (4) and would thus present a lesser moment arm to restrain rotation.

Another feature of this design is the desirability of a system which externally can inform the operator when the assembly operation is complete. This is achieved through the shaping of the external nut design shown in FIG. 1. This nut design is shaped asymmetrically for a number of reasons. First, when the asymmetric surfaces on the first and second assemblies are aligned, it can be seen that the designs are properly rotated. As shown in the cross sections in FIGS. 2 and 5, the nut on each assembly body may include a corresponding first and second pair of flat side sections (21) and (24). Especially for a two flanges design as shown, each of these pairs of flat side sections may be configured so that they diametrically oppose each other on each of their respective fluid fitting bodies. Further, they may be parallel to the central axis and, as with the abutment shown in FIG. 5, perpendicular to a line extending from the flat side sections through the central axis. When the flat side sections are aligned, the parts are correctly assembled.

Second, the asymmetric design of the external nuts serves to add strength. As shown in FIG. 5, when the flat side sections are configured to be orthogonal to the planar sections forming the abutment (27), the thinner walls existing will not be in the area of maximum stress. This is because in between each of the first and second pairs of flat side sections (21) and (24), may be corresponding pairs of toothed face segments (23). As shown, these are diametrically opposed adjacent to the flat side sections. In order to include as much material as possible at the most highly stressed area, namely, in the vicinity of the lip support (10), it may be desirable to provide five teeth (26) on each of the tooth faced segments and to radially align them with the inner surface (11) of the lip support (10). Perhaps surprisingly, this can add about 60% to the pressure strength of the coupling. When the designs are under pressure, since retaining lip (12) acts to axially retain flange (14), the forces will be spread over a larger area.

As yet another benefit, when each of the fluid fitting assemblies have these nut designs, they may be assembled with either an open-end wrench or a box wrench. Thus a box wrench (12 point) is accommodated by having five teeth in between each planar surface. Other designs are also possible, including, but not limited to two and three point designs which would still fit a box wrench and the like. The enhanced gripping of such a design can be extremely important for a molded component because not only is the material likely a plastic, but it also may have been specifically chosen to be flexible to accommodate the radial resiliency desired for the rotational lock discussed earlier. This nut design might even be considered an independent invention as it may have application not only in other fields in the fluid fitting area, but also in other general areas such as the fastening area.

As shown in FIGS. 1 and 3, in order to facilitate molding at the location of the planar section on the inner surface (11) of the lip support (10), the design shown includes access entries (30) beneath the retaining lip (12) and adjacent the inner surface (11). Access entries (30) may serve to allow the mold to include inserts through the access entry (30) to form the undercut necessary to create the lip (12). For further efficiency, the inner surface (11) of the lip support (10) can be planar throughout its entire length so that these inserts can be easily pulled out with only one motion. Thus the piece can be made with less complicated molds. Naturally, the access entries (30) are not mandatory as other molding arrangements are possible.

Another unique embodiment of the invention is shown in FIG. 6. As mentioned a host of different ways to lock the coupling against rotation are possible. This embodiment involves the use of a spring member (31) which has an integral rotational lock. Rather than being radially resilient, this rotational lock is essentially tabs (33) on the spring member (31) which are designed to fit within the flange recesses (32). Once the tabs (33) are positioned within the flange recesses (32), the flanges (14) will be prohibited from rotating. Thus the coupling will be locked together. Unrelated to this locking, it should be noted from FIG. 6, that the first fluid fitting assembly (1) can be molded without the inclusion of any access entries.

FIG. 6 also shows that the spring number (31) can be rotationally restrained when assembled onto the second fluid fitting assembly (2). In the design shown this is accomplished in one way by a pair of diametrically opposed chord supports (39). The chord supports (39) both support the tabs (33) and extend internally so as to fit within corresponding chord recesses (34) on the second fluid fitting assembly (2). Through this arrangement, it can be understood that spring member (31) will not be permitted to rotate with respect to second fluid fitting body (7). Thus, when tabs (33) are inserted within the flange recesses (32), the entire coupling will be held together. Naturally, it should be understood that a host of different designs are possible in order to limit rotation. Each should be considered an equivalent as the broad conceptual goal is all that needs to be met. Through the design of the chord support (39) it also is impossible to assemble the spring member (31) backwards. It should also be understood that through proper design it is also possible to provide rotational locking without having the spring memeber (31) locked to the second fluid fitting assembly (2). One possibility would be to lengthen the tabs (33) so that they could extend beyond the lip and thus engage the flanges (14). This might require more spring travel.

The operation of the design shown in FIG. 6 is fairly simple. First, the first and second fluid fitting assemblies were axially aligned and inserted so that flanges (14) sit within the corresponding portions of the first fluid fitting assembly (1). This axial insertion compresses the spring member (31). By rotating one fluid fitting assembly with respect to the other, the flanges (14) are axially retained when they slide underneath the retaining lips (12) as discussed earlier. When the flanges are fully rotated, tabs (33) will align with the flange recesses (32) and the decompressing of the spring member (31) will cause the tabs (33) to snap into the flange recesses (32). This will effectively lock the device together.

As an enhancement to the durability of this design, it may also be desirable that when tabs (33) snap into a recess such as the flange recesses (32), the spring member (31) is no longer compressed. Since the compression of the spring member serves no purpose other than merely holding the tabs (33) in place, the lack of compression will not adversely affect its rotational locking function. Thus, by completely relaxing spring member (31), it will not be subjected to continuous compression and thus will not tend to lose its full amount of original resiliency. To disassemble the coupling, the spring member (31) need only be compressed by gripping the outer end portion surface (38), and sliding it axially so as to compress the spring segment (37) and thus remove tabs (33) from flange recesses (32). To facilitate this gripping, the outer end portion surface (38) may be textured. Then the two assemblies may be rotated and axially separated.

The design shown on FIG. 6 also includes a number of enhancements. First, spring member (31) is cylindrical so that it surrounds a portion of the second fluid fitting assembly (2). This is stronger, minimizes the exposure to wear, and also serves to protect the fitting assembly. The integral rotational lock is shown as positioned on an annular end portion (35) of the spring member (31). By placing tabs (33) on the annular end portion (35) so that they project off of the annular end portion but do not fully extend to the outer edge of the annular edge portion, tabs (33) are likewise protected by the outer end portion (38) of the spring member (31). This also allows the sections in between the retaining lips to be included as mentioned earlier.

At the other end of the spring member (31) is a cylindrical spring segment (37). This segment is designed in a manner so as to be easily molded. In keeping with the goal of providing an easily and inexpensively manufactured item, it can be seen that the individual spring members (31) may be a single molded unitary design. This affords the economic advantages mentioned earlier while simultaneously achieving a rotational lock which is disposed between the first and second fluid fitting assemblies (1 and 2).

Figure 9:
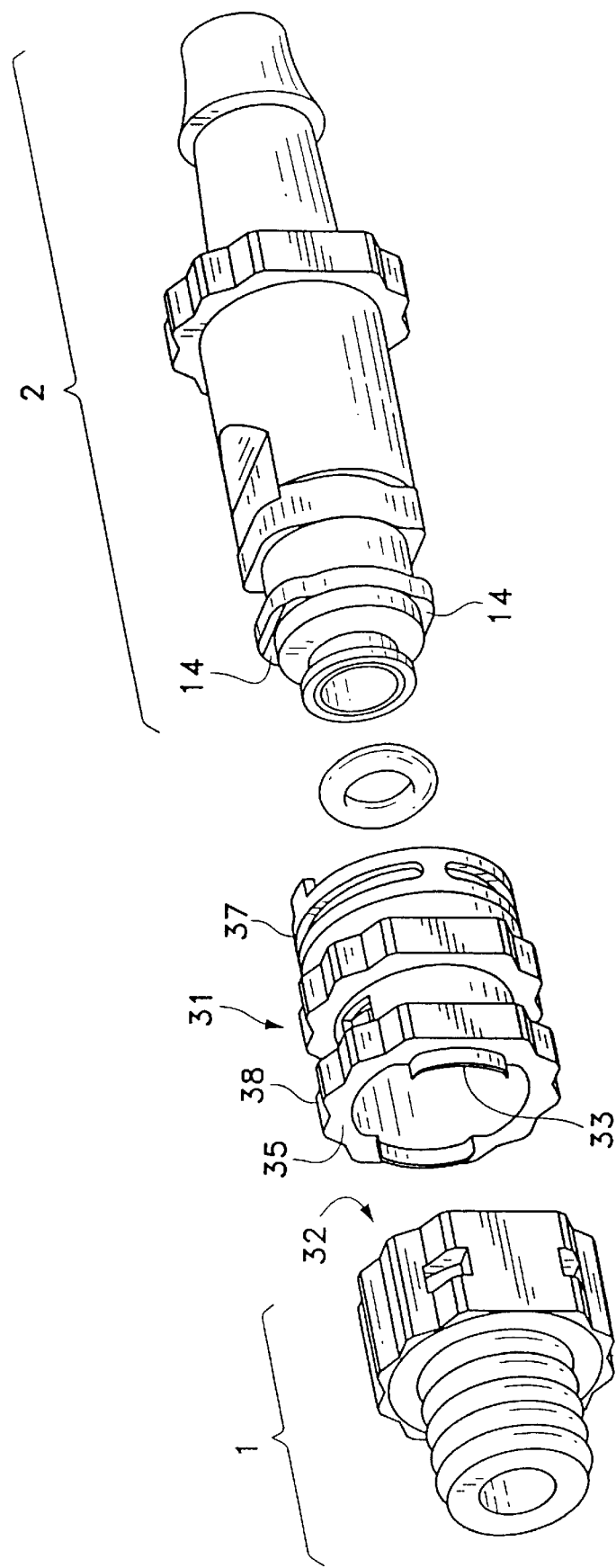
FIG. 9 is a perspective view of the spring member design shown in FIG. 8.

An alternative design for a unitary spring member is shown in FIGS. 8 and 9. In this unitary molded design, it can be seen that one end portion may include a catch (40) which may serve to interact with other portions of second fluid fitting assembly body (7) to hold the spring member (31) onto the second fluid fitting assembly body (7). Again, this design may be easily molded by making the catch (40) a flexible portion which would snap over some annular ring or the like on an inner portion of the second fluid fitting assembly (2). By placing the catch (40) on the end of the spring member (31) which is away from the spring, the design may achieve a goal of limiting the extensibility of the spring so as to prevent over-extension.

To illustrate another alternative, the embodiment shown in FIG. 6 is shown including a different flange design. As shown in FIGS. 6 and 7, this flange design is noncircular, not for rotational locking, but in order to stop rotation at the desired point as mentioned earlier. Since the spring member (31) will serve to achieve the rotational locking function, rotational locking through the action of the abutment between flange (14) and the first fluid fitting assembly (1) is unnecessary. Rather, the asymmetry of the flanges (14) shown serves to stop rotation at the proper spot. FIG. 7 shows a cross section view of such flanges as they might be positioned when fully assembled. As can be appreciated, the shape of the flange prevents further rotation in the direction shown. Naturally, such a design might be incorporated in other embodiments and might even be incorporated in the embodiment including the resilient radial detent mentioned earlier.

As yet another enhancement to the coupling system described, all of the designs mentioned may include a swivel feature. As shown in FIG. 10, this can be accomplished through the use of a stem (41) which is designed to be rotatably positioned within a central cavity of one of the fluid fitting assembly bodies such as an assembly body externally similar to second fluid fitting assembly body (7). By establishing the stem (41) so as to rotate freely within the second fluid fitting assembly body (7), any hose or other fluid handling system may be allowed to rotate and not kink or otherwise negatively impact the seals maintained. This may be very important for a design such as that shown in FIG. 1 where rotation could unlock the coupling.

Importantly, the stem (41) must be axially retained with respect to the second fluid fitting assembly body (7). This can be accomplished through flexible projections (46) which would serve to snap over the stem (41) and retain it axially within the body. When fitting the stem (41) within the central cavity (42) of the second fluid fitting assembly body (7), it will be appreciated that it may be important to create a seal between the stem (41) and the fluid fitting assembly. This may be accomplished by a stem O-ring (43) which would be free to rotate and slide within the assembly while maintaining its seal.

As shown, stem (41) may be molded in a fashion which includes molding recesses to allow even thickness or mold gate vestage as those skilled in the molding field would well appreciate. Similarly, stem (41) may include a fitting end (45) integral to it to allow connection to fluid sources, or otherwise. Naturally, the swiveling component may be designed into either the male or female assembly.

Figure 11:
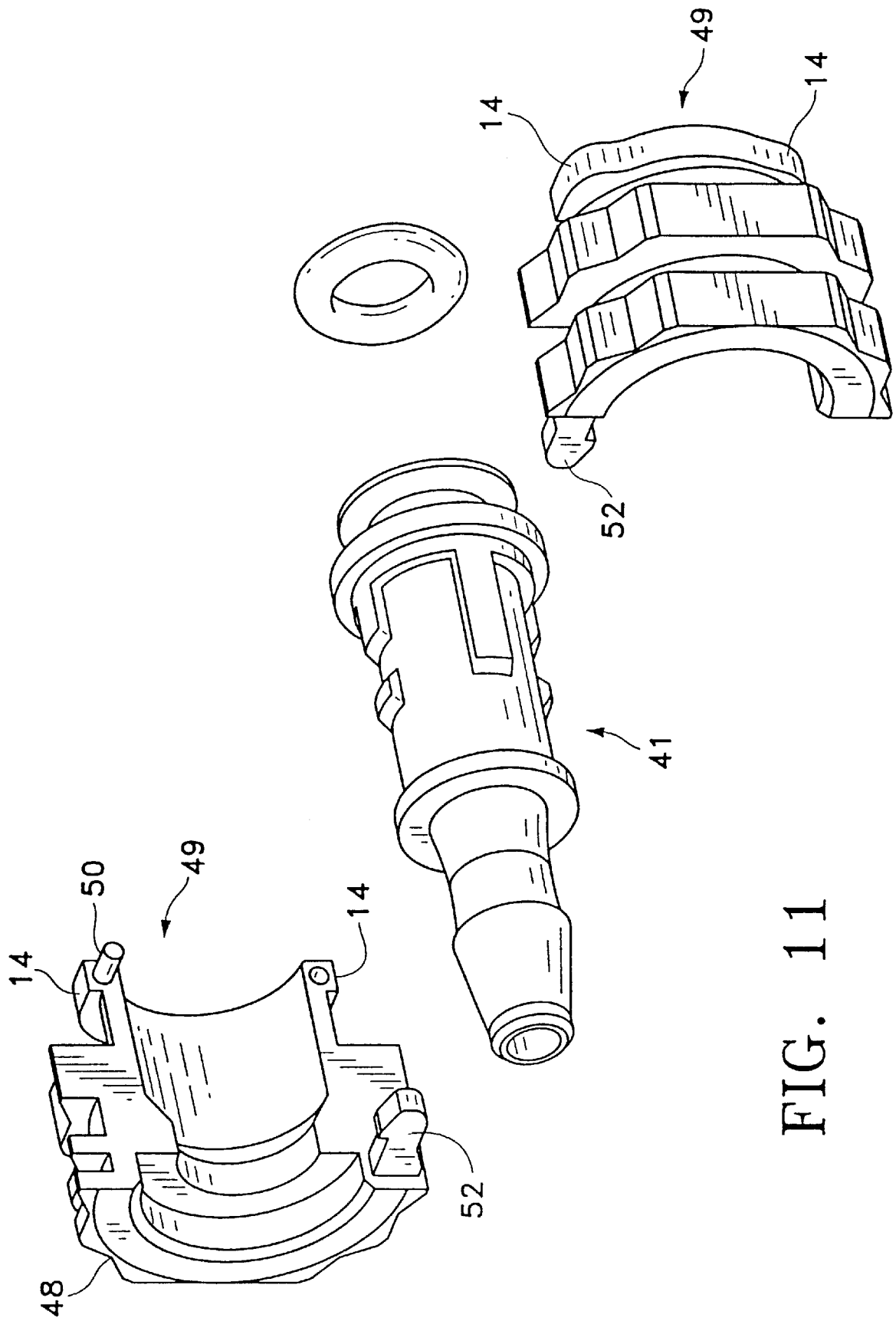
FIG. 11 is an exploded perspective view of another swiveling design.
Figure 12:
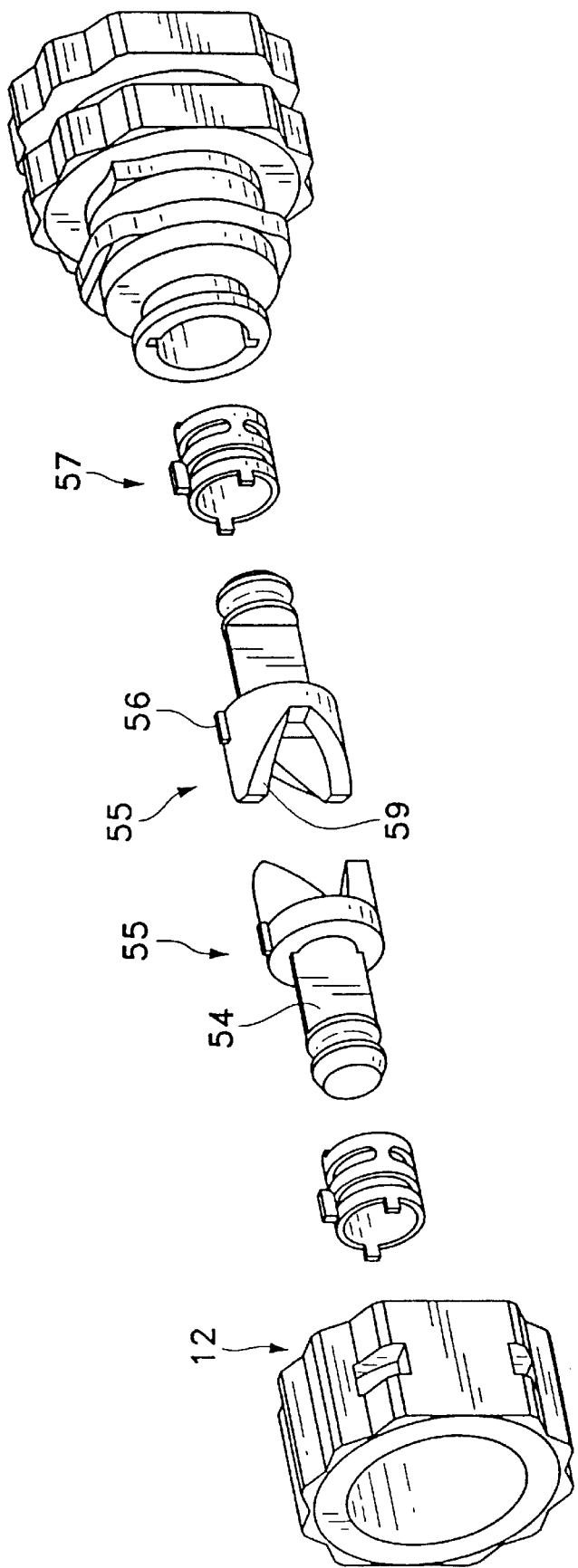
FIG. 12 is an explode perspective view of an embodiment with dual shut-off valves.
Figure 14:
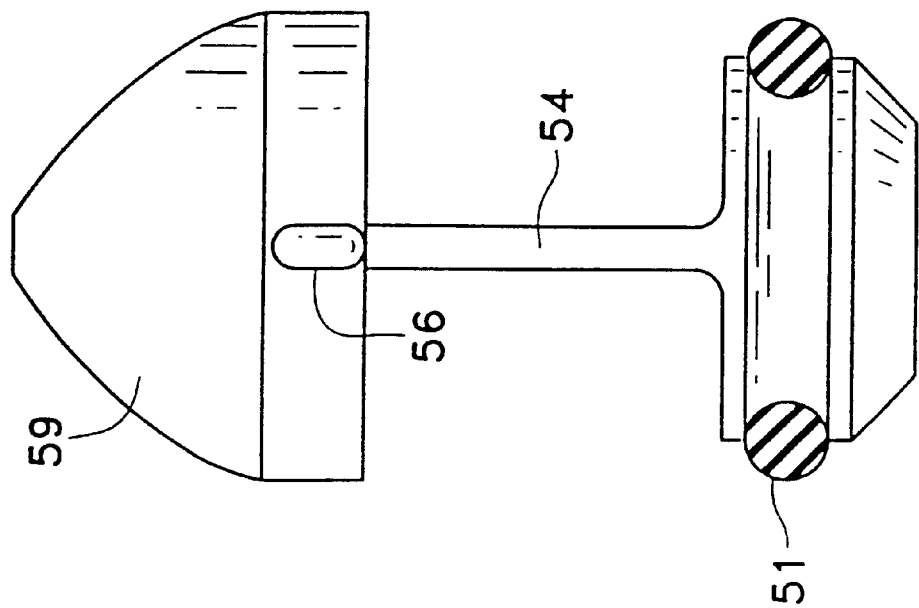
FIG. 14 is a side view of the shut-off valve member shown in FIG. 13.
Figure 13:
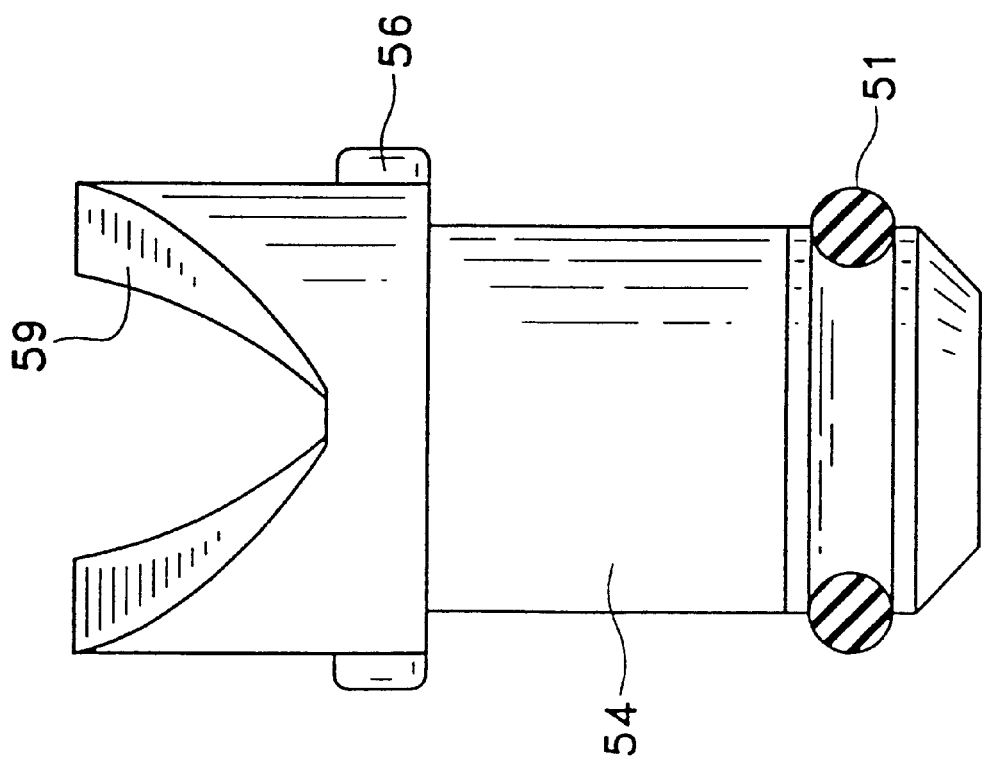
FIG. 13 is a front view of a shut-off valve member.

The use of internal flexible projections (46) is but one technique for retaining stem (41) within its corresponding fluid fitting assembly body. A host of other designs are also possible as those skilled in the art would readily understand. As shown in FIG. 11, one of the many other alternatives available would be the inclusion of an assembled body around stem (41). This assembled body might be made of two semicircular body halves (49) which would be assembled around the stem (41). In the design shown, the body halves (49) may include some type of a retainer element (52) to hold them together. They may also include guiding pins (50) and corresponding holes. The retainer elements (52) shown would hold the body halves (49) together through their barb design. As shown, the retainer elements (52) might be positioned on an end opposite the inserted end which has on it flanges (14) so that when the coupling was fully assembled, flanges (14) would be held together by the female portion and thus reduce the amount of stress which the retainer elements (52) would need to support (if any). Further, on designs which utilize the unique nut shape mentioned earlier, it may be possible and desirable to position the end of the retainer elements (52) at the bottom (48) of a tooth (26). In this fashion, it is less likely that such elements (52) would be exposed or subjected to forces which might cause it to disengage.

As mentioned earlier, it is often desirable for coupling systems to include shut-off valves so that they automatically seal when disengaged. In such systems, the valve is normally closed and is held open only by some force other than the fluid pressure. Some of the possible shut-off valve designs are shown in the figures. Referring to FIGS. 12 through 19, it can be seen how a double shut-off valve design, that is, one in which each fitting assembly has its own shut-off valve may be achieved. As shown, both the first and second fluid fitting assemblies (1 and 2) include an axially moveable valve (55). This axially moveable valve (55) is responsive to rotation through an annular angled surface (59) which is angled with respect to a plane perpendicular to the central axis. When such a valve is designed to be responsive to rotation, it is likely important to include a rotational guide (56) which rotationally restrains the axially moveable valve (55) so that the rotation is forced to cause axial movement and thus to open the valve. A valuable feature of the design shown is the fact that the system shown may be designed so that before any opening of either axially moveable valve (55) occurs, the first and second fluid fitting assembly may be axially retained with respect to each other. This can be accomplished by allowing the initial portion of rotation to cause the flanges (14) to become slightly positioned underneath lip (12) prior to any engagement of the axially moveable valves (55).

To assemble this design the initial insertion causes the coupling seal (18) to be established between the first and second fluid fitting assemblies. After this has been accomplished the axially moveable valves (55) can open with no fluid flow outside of the coupling assembly. Once the flanges (14) are positioned under the lips (12) the assemblies are at least temporarily axially restrained. As further rotation continues, this rotation will now cause the shut-off valves to begin to open while simultaneously causing the flanges (14) to further be positioned underneath the lips (12). In this fashion, the present design avoids any risk of blow-off and thus the pressure of the fluid will be less likely to cause premature separation of the two fluid fitting assemblies before they have been fully engaged. This is naturally true regardless of whether there is one or two shut-off valves. When there are two shut-off valves, however, the lower pressure of the exit side will likely cause it to open first. Thus, when the pressure side begins to open an exit is already established thus even further lowering the resistance and risk of blow-off. This also has the benefit of allowing greater axial retention to occur when the higher pressure is released.

As may be appreciated, the shut-off valves may operate in somewhat traditional fashion with respect to their sealing. This might be accomplished through the use of shut-off valve seals (51) which are responsive to an axially moveable valve support (54) to which is attached the annular angled surface (59). By also including a valve spring member (57), the axially moveable valve (55) will be yieldably urged into the closed position. In a potential departure from one of the goals of the invention, it might be understood that valve spring member (57) while capable of being molded, might be selected to be a metallic spring. This for the simple reason that since the majority of the use would have the shut-off valve be open, a plastic spring may loose its resiliency whereas a metal spring might retain it. Naturally, as better materials are discovered or tested, this might prove to be unnecessary and an entirely molded design might be as reliable.

The integral spring design shown also can minimize assembly and manufacture requirements. Such a spring simply need be inserted over the valve support (54) and then the shut-off valve seal (51) can be inserted to hold it in place. Importantly, once the valve spring member (57) urges the shut-off valve seal (51) to a closed position, a fluid passageway seal would be created so that no fluid could flow. Further, the pressure of the fluid would serve to enhance the seal as would be readily understood.

Figure 17:
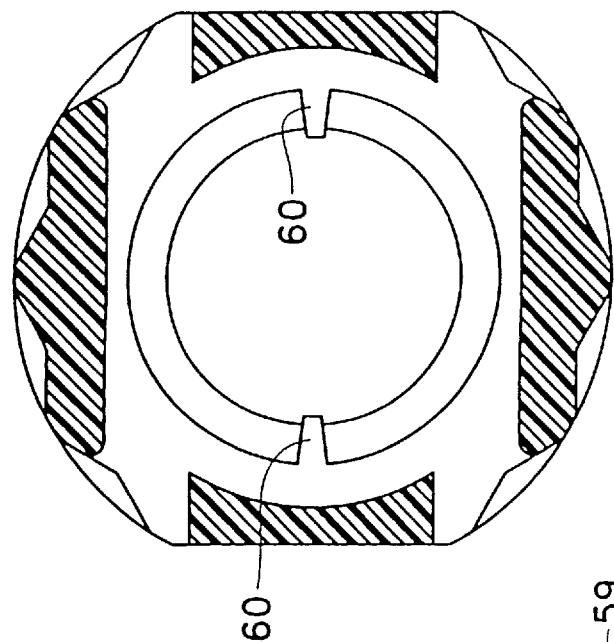
FIG. 17 is an end view of a single shut-off valve embodiment.

As mentioned earlier, single or double shut-off valve designs can be accomplished. In a single shut-off valve design, it might be understood that a rotationally fixed slide (60) might be included. This is shown in FIG. 17. This rotationally fixed slide (60) would serve to engage the annular angled surface (59) on the only shut-off valve in the system and thus open it at the appropriate time. As those skilled in the art would readily appreciate, this rotationally fixed slide might have a host of different designs from bars to tabs and other types of designs. It may be separate or integral to the other fitting assembly, as well.

Figure 16:
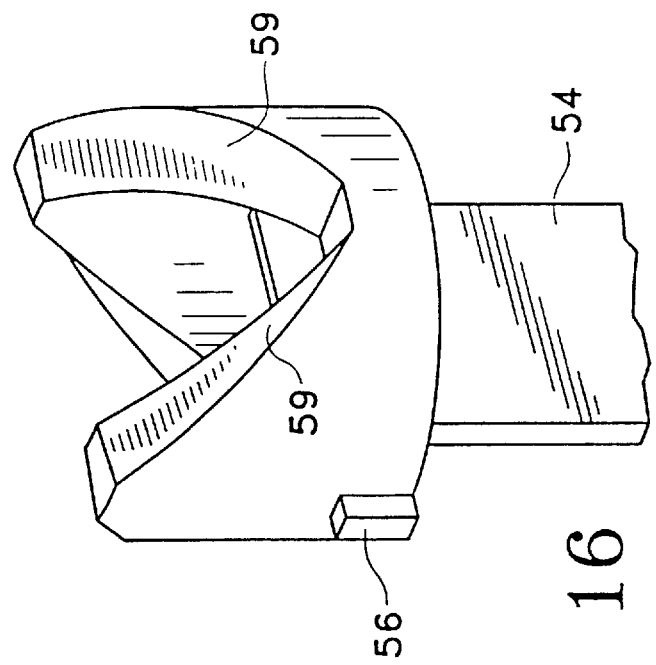
FIG. 16 is a perspective view of the radially helical surface as might be used in a shut-off valve.
Figure 15:
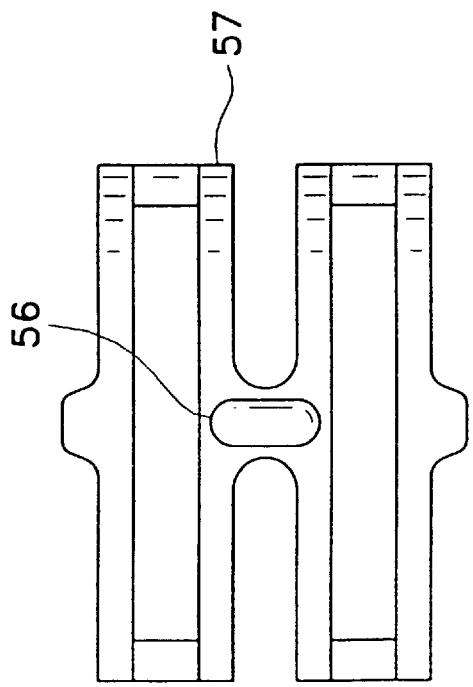
FIG. 15 is a side view of a shut-off valve spring member.

FIG. 16 shows the nature of the annular angled surface (59) as optimally designed for either a single or double shut-off valve system. As this figure shows, the annular angled surface may be a radially helical surface so that throughout rotation maximum contact is achieved. This will minimize wear. The radially helical surface is angled with respect to a plane perpendicular to the central axis to achieve the axial movement desired. Naturally, other surface shapes are possible as well. As also shown in each of the shut-off valve figures, the double shut-off valve design may include two pairs of surfaces. This might allow rotation in either direction. Naturally, a single surface would be appropriate for designs which include the stops (20) mentioned earlier as two-way rotation would not be possible in such designs.

Figure 18:
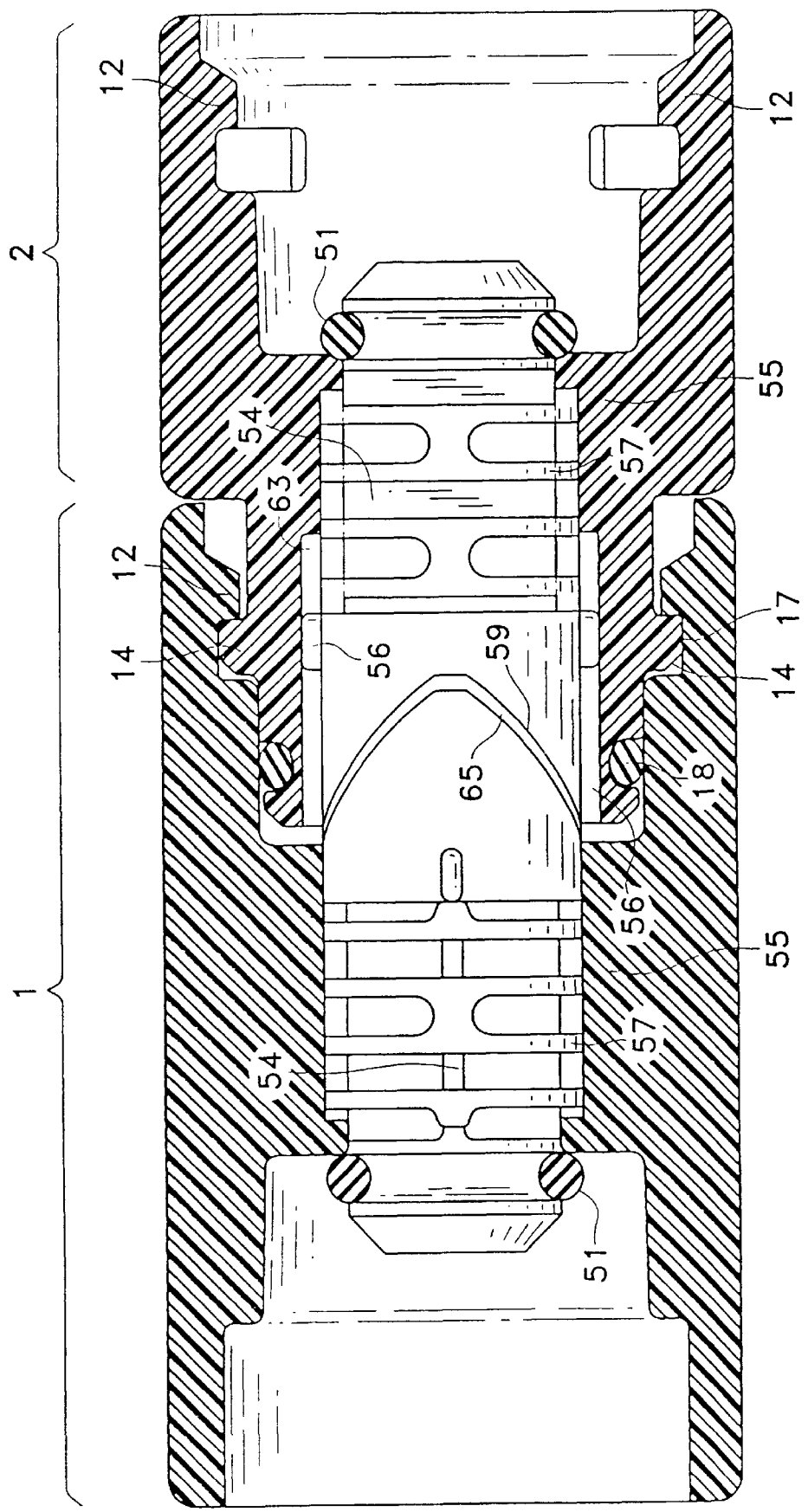
FIG. 18 is a cross sectional view of the dual shut-off valve design shown in FIG. 13 prior to locking the coupling together.
Figure 19:
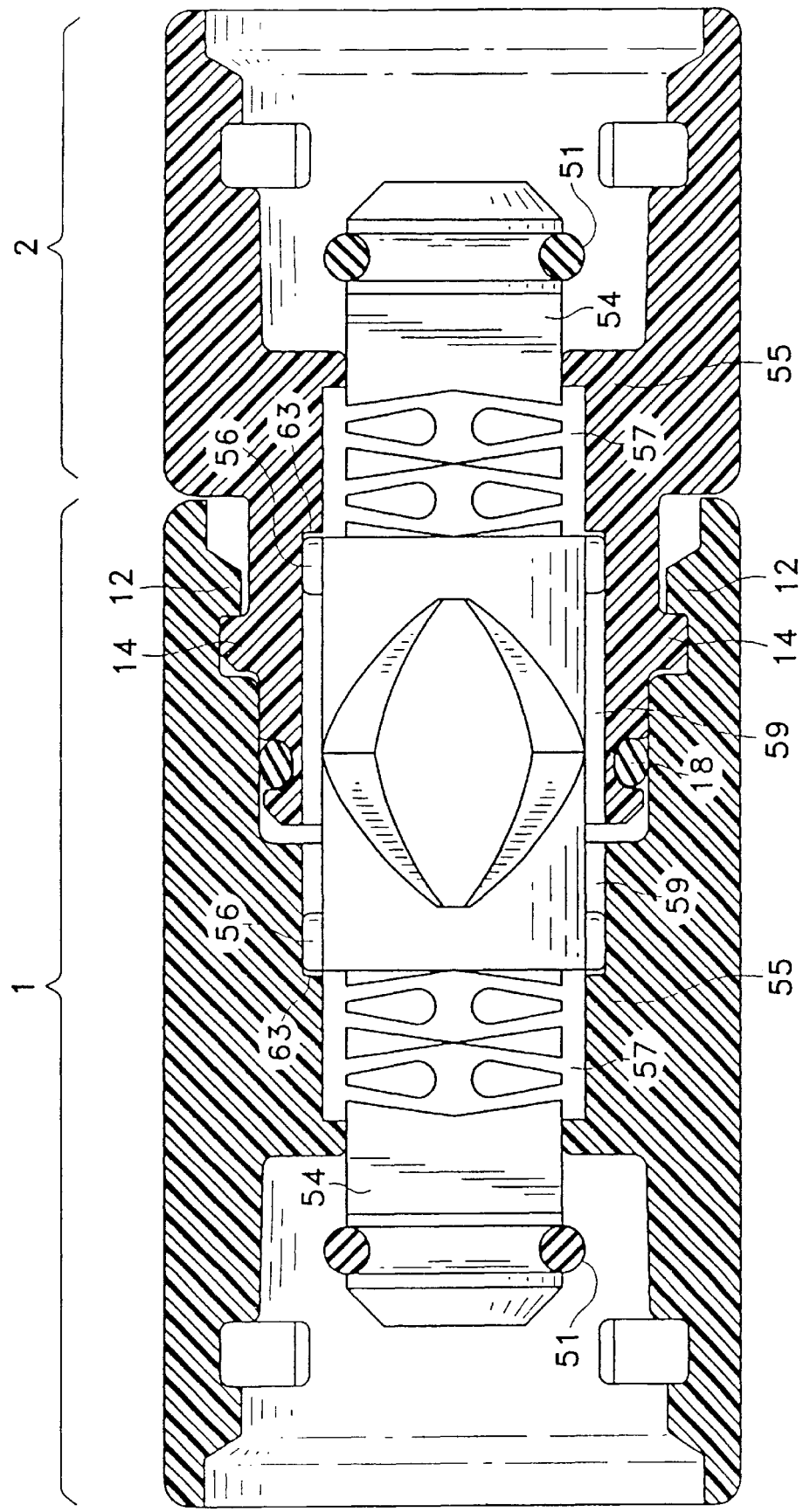
FIG. 19 is a cross sectional view of the dual shut-off valve design shown in FIG. 13 after locking the coupling together.

Referring to FIGS. 18 and 19, it may be understood how yet another feature of a double shut-off valve design might be accomplished. As mentioned earlier, the shut-off valves may not simultaneously open. In order to assure that they both do fully open, each shut-off valve may include a corresponding valve stop (63). This valve stop may limit the axial movement response of each shut-off valve so that when one is fully opened, it is restrained, and thus the other must open to its full amount. As shown, valve stop (63) can be achieved in conjunction with the rotational guide (56) by merely ending the recess within which sliding may occur. Naturally, other designs are possible as well, but importantly, the use of a stop will force the other fluid fitting passageway seal to open an equal amount. This stop could also be the compression of the valve spring member (57) to its solid height.

In addition, in FIG. 18 it can be seen how the design can accomplish the delay in opening the valve. As shown, the two annular angled surfaces (59) do not initially engage each other. Instead a gap (65) is formed. Only after some rotation of the two bodies—and thus some axial retention—do the two surfaces engage each other causing axial motion opening the two valves.

Also, as a comparison of FIGS. 18 and 19 would highlight and as mentioned earlier, it is possible to either include or not include the access entries. They are not shown on the first fluid fitting assembly (1) of FIG. 18, but are shown in its corresponsing part in FIG. 19 to illustrate this aspect. Nuts could also be included on such designs but are not shown on either of these two figures. In addition, through the designs shown in FIGS. 18 and 19 it can be understood how a shut-off valve component can be an important part of the system presented. As shown, either part can be designed to include retaining lips (12) on both ends so that they may be used as a spliced insert to place a shut-off valve in the system.

The foregoing discussion and the claims which follow describe the preferred embodiments of the present invention. Particularly with respect to the claims, it should be understood that changes may be made without departing from their essence. In this regard it is intended that such changes would still fall within the scope of the present invention. It is simply not practical to describe and claim all possible revisions to present invention. To the extent such revisions utilize the essence of any feature of the invention, each would naturally fall within the breadth of protection encompassed by this patent. It is also true that various permutations and combinations might be achieved. Again, each of these permutations and combinations should be encompassed by this patent.

I claim:

1. A method of coupling fluid fitting assemblies together comprising the steps of:
   a. axially engaging a first fluid fitting assembly having a first fluid fitting body, a central axis, and a first fluid passageway and a second fluid fitting assembly having a second fluid fitting body, a central axis, and a second fluid passageway;
   b. compressing a spring member disposed between said first and second fluid fitting assemblies;
   c. rotating said first fluid fitting body with respect to said second fluid fitting body;
   d. axially retaining said first fluid fitting assembly with respect to said second fluid fitting assembly;
   e. decompressing said spring member; and
   f. rotationally retaining said first fluid fitting body with respect to said second fluid fitting body through action of said spring member wherein said step of rotating said first fluid fitting body starts after the start of said step of compressing said spring member.

2. A method of coupling fluid fitting assemblies together as described in claim 1 wherein said step of compressing said spring member comprises the step of axially compressing said spring member.

3. A method of coupling fluid fitting assemblies together as described in claim 2 and further comprising the step of completely relaxing said spring member.

4. A method of coupling fluid fitting assemblies together as described in claim 2 wherein said step of axially engaging said first fluid fitting assembly and said second fluid fitting assembly comprises the step of inserting a flange into a flange recess and wherein said step of rotationally retaining said first fluid fitting body with respect to said second fluid fitting body comprises the step of inserting a restraining tab into said flange recess.

5. A method of coupling fluid fitting assemblies together as described in claim 1 further comprising the steps of:
   a. freely allowing rotation of a stem with respect to at least one of said fluid fitting assemblies when accomplishing said step of rotating said first fluid fitting body with respect to said second fluid fitting body;
   b. axially retaining said stem with respect to the fluid fitting body surrounding it; and
   c. sealing said stem to said other fluid fitting assembly.

6. A method of coupling fluid fitting assemblies together as described in claim 5 further comprising establishing a pair of generally semi-circular body halves around said stem.

7. A method of coupling fluid fitting assemblies together as described in claim 6 wherein said axially retaining said stem with respect to the fluid fitting body surrounding it further comprises rotatably engaging said pair of generally semi-circular body halves around said stem with said stem retaining element.

* * * * *